(12) United States Patent
Suzuki et al.

(10) Patent No.: US 6,849,111 B2
(45) Date of Patent: Feb. 1, 2005

(54) BLACK INK FOR INK-JET RECORDING HAVING DISPERSED PARTICLES WITH SPECIFIC VOLUME MEAN DIAMETER, INK SET AND INK-JET RECORDING METHOD USING THE SAME

(75) Inventors: Atsushi Suzuki, Ebina (JP); Kunichi Yamashita, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/449,769

(22) Filed: Jun. 2, 2003

(65) Prior Publication Data

US 2004/0035323 A1 Feb. 26, 2004

(30) Foreign Application Priority Data

Jun. 3, 2002 (JP) ........................................ 2002-161850

(51) Int. Cl.⁷ .......................... C09D 11/02; G01D 11/00
(52) U.S. Cl. .................... 106/31.65; 106/31.6; 347/100
(58) Field of Search ............................. 106/31.65, 31.6; 347/100

(56) References Cited

U.S. PATENT DOCUMENTS

| 5,571,311 | A | * | 11/1996 | Belmont et al. | ......... 106/31.28 |
|---|---|---|---|---|---|
| 6,153,001 | A | * | 11/2000 | Suzuki et al. | ............ 106/31.65 |
| 6,367,923 | B1 | * | 4/2002 | Koitabashi | ................... 347/101 |
| 6,387,168 | B1 | * | 5/2002 | Koitabashi et al. | ........ 106/31.6 |
| 6,425,662 | B1 | * | 7/2002 | Teraoka et al. | ............. 347/100 |
| 6,471,757 | B1 | * | 10/2002 | Koitabashi et al. | ...... 106/31.28 |
| 6,503,307 | B1 | * | 1/2003 | Noguchi | ................... 106/31.27 |
| 6,695,443 | B2 | * | 2/2004 | Arita et al. | ................. 347/100 |
| 2002/0075369 | A1 | * | 6/2002 | Ota et al. | .................... 347/100 |
| 2002/0088375 | A1 | * | 7/2002 | Komatsu et al. | ............ 106/472 |

FOREIGN PATENT DOCUMENTS

| JP | A 8-3498 | 1/1996 |
|---|---|---|
| JP | A 10-510862 | 10/1998 |
| WO | WO 96/18695 | 6/1996 |

* cited by examiner

*Primary Examiner*—Mark L. Bell
*Assistant Examiner*—Veronica F. Faison
(74) *Attorney, Agent, or Firm*—Oliff & Berridge, PLC

(57) ABSTRACT

The present invention provides an ink-jet recording black ink containing at least water, a water-soluble organic solvent and a self-dispersible carbon black, and an ink-jet recording ink set and an ink-jet recording method using the ink-jet recording black ink. A volume mean diameter of dispersed particles contained in the black ink is in a range of 85 to 115 nm, and a volume of dispersed particles having a particle diameter of 0.5 to 1.0 µm contained in the black ink is in a range of 0.001 to 0.03% relative to a volume of the ink.

20 Claims, No Drawings

BLACK INK FOR INK-JET RECORDING HAVING DISPERSED PARTICLES WITH SPECIFIC VOLUME MEAN DIAMETER, INK SET AND INK-JET RECORDING METHOD USING THE SAME

CROSS-REFERENCE TO RELATED APPLICATION

This application claims priority under 35 USC 119 from Japanese Patent Application No. 2002-161850, the disclosure of which is incorporated by reference herein.

BACKGROUND OF THE INVENTION

1. Field of the Invention

The present invention relates to a black ink for ink-jet recording used in an ink-jet recording apparatus (e.g., a printer, a copier, a facsimile, or a word processor), and an ink set for ink-jet recording and an ink-jet recording method in which the black ink is used.

2. Description of the Related Art

The principle of an ink-jet recording method is that a liquid or fused ink is discharged through nozzles, slits, or a porous film to record images on a recording medium such as paper, a cloth, a film, or the like. Various methods of discharging an ink have been proposed, such as a so-called charge control method using an electrostatic induction force to discharge an ink; a method using vibrational pressure of a piezoelectric element to discharge an ink; and a so-called thermal ink-jet method forming and growing gas bubbles with heat to thereby generate pressure and then discharge an ink with the pressure, and any of these recording methods can provide an extremely precise image. Since an ink-jet recording apparatus is advantageous due to its compactness, inexpensiveness and silence, energetic studies have been conducted thereon, and many kinds of printers including not only monochrome printers but also color printers capable of recording full-color images, with which a good printing quality is obtained on plain paper such as report paper, copy paper, or the like, have been recently sold on the market, thereby attaining a large share in the field of recording apparatus.

The following characteristics are required for an ink-jet recording ink used in the ink-jet recording apparatus: (1) that the ink can provide uniform, bleeding-free and fog-free images with high resolution and high density on paper; (2) that the ink does not cause nozzle clogging which usually occurs due to drying of the ink at a distal end of a nozzle and that a good discharging responsiveness and a good discharging stability can be always obtained; (3) that the ink rapidly dries on paper; (4) that light resistance of the resultant image is good; and (5) that a long-term storage stability of the ink is good. In particular, with quickening of printing speeds, there is a need for an ink that rapidly dries even when applied to plain paper such as copy paper and that can provide a high image quality.

Ink-jet recording inks including dye as a colorant have been mainly employed, but such inks are poor in water resistance and light resistance. Therefore studies on inks including a pigment as a colorant have been conducted in order to solve such problems. Since a pigment is essentially insoluble in water, a method in which a dispersant is used in the ink has been studied as a method for stably dispersing the pigment in an ink. In the case where a surfactant is used as the dispersant, a surface tension of the resultant ink decreases to a greater extent than is necessary, easily causing degradation in printed image quality and non-printed gaps due to bubbles. In the case where a polymer dispersant is used, a viscosity of the ink tends to increase, and it is hard to achieve compatibility between ink-jet characteristics and dispersion stability. A common problem in methods in which a dispersant is used is that dispersion tends to become unstable due to interaction of a solvent, an additive or the like that is added to adjust ink characteristics, with the dispersant.

In view of such circumstances, a method has been being studied in which a dispersible pigment that has been made hydrophilic is used without using a dispersant. For example, Japanese Patent Application Laid-Open (JP-A) No. 8-3498 and Japanese Patent Application National Publication (Laid-Open) No. 10-510862 disclose methods and inks in which carbon black is made hydrophilic and used without a dispersant.

The methods for making a pigment hydrophilic solve problems caused by use of the above-described dispersant or improve ink properties by improving a hydrophilicity of surfaces of pigment particles to make the pigment self-dispersible in an aqueous medium. The use of such an ink enables ink characteristics close to those of an ink including a water-soluble dye which has been the main colorant employed for ink-jet recording ink.

In the case where ink-jet recording is adopted in an office, plain paper which is mainly used there includes a variety of products depending on the locality and availability. Therefore, it is necessary to obtain black images having satisfactory density and sufficient sharpness at edge portions thereof on such various kinds of paper.

Moreover, high-speed printing is needed from the viewpoint of better productivity in printing. However, in high-speed printing, the above-described black image quality, sufficient reduction in drying time of an ink, and, in the case where an interval between completion of monochrome printing and initiation of subsequent color printing or vice versa is short, prevention of bleeding of monochrome or color image portions has not been realized yet.

Therefore, there is a need for an ink-jet recording black ink which provides, on various kinds of plain paper, images having good black image density even if a drying time is short, and which does not easily bleed in boundaries between black image portions and color image portions when an interval between completion of monochrome printing and initiation of subsequent color printing or vice versa is short. Moreover, there is need for an ink-jet recording ink set and an ink-jet recording method using the ink-jet recording black ink.

SUMMARY OF THE INVENTION

A first aspect of the invention is to provide an ink-jet recording black ink comprising at least water, a water-soluble organic solvent and a self-dispersible carbon black, wherein a volume mean diameter of dispersed particles contained in the ink is in a range of 85 to 115 nm, and a volume of dispersed particles having a particle diameter of 0.5 to 1.0 $\mu$m contained in the ink is in a range of 0.001 to 0.03% relative to a volume of the ink.

A second aspect of the invention is to provide an ink-jet recording ink set including the ink-jet recording black ink, and at least one of a cyan ink, a magenta ink and a yellow ink.

A third aspect of the invention is to provide an ink-jet recording method in which ink droplets of the ink-jet recording ink set are discharged onto a recording medium according to recording signals to record an image.

DETAILED DESCRIPTION OF THE INVENTION

The present invention will be described in detail below.

Ink-jet recording Black Ink

The ink-jet recording black ink of the invention contains dispersed particles having a volume mean diameter of 85 to 115 nm and preferably from 90 to 110 nm. If the volume mean diameter of the dispersed particles is less than 85 nm, the density of the image printed on plain paper is low and a variation in the density due to types of paper used increase. On the other hand, if the volume mean diameter is excessively larger, storage stability of the ink decreases.

Dispersed particles contained in the black ink include carbon black particles as a colorant, polymer particles dispersible in water, and the like. The volume mean diameter of the dispersed particles is defined here as a value measured by using an ink which has not been diluted and Microtrack UPA particle size analyzer 9340 (manufactured by Leeds & Northrup Co.). As for parameters input to the particle size analyzer in measurement, the viscosity of an ink to be measured is used and the density of dispersed particles is set to 1.8 g/cm$^3$.

In an ink-jet recording black ink of the invention, the volume of dispersed particles having a particle diameter of 0.5 to 1.0 µm contained in the ink is in the range of 0.001 to 0.03%, preferably in the range of 0.005 to 0.02% and more preferably in the range of 0.007 to 0.02% relative to the entire volume of the ink. When the volume of such dispersed particles is less than 0.001%, the resultant image density becomes low. When the volume of such dispensed particles is more than 0.03%, reliability in printing is degraded after the ink is left for a long period of time.

Herein, the volume of particles having a particles diameter of 0.5 µm to 1.0 µm is measured with Accusizer™ 770 Optical Particle Sizer (manufactured by Particle Sizing Systems Inc.) and, in measurement, 2 µl of an ink is put in a measurement vessel contained in the apparatus and the ink is automatically diluted to a desired concentration and the resultant is introduced into a measuring section and measurement is conducted. The apparatus detects particles passing through the measuring section with an optical technique.

In order to control the volume mean diameter of the dispersed particles contained in the ink and the volume of the dispersed particles having a particle diameter of 0.5 to 1.0 µm in respective desired ranges, a liquid dispersion of a pigment (carbon black) used in the ink or the ink itself can be centrifuged or filtered, or dispersible particles other than the pigment can be added to the ink.

An ink-jet recording black ink of the invention contains at least water, an water-soluble organic solvent and a self-dispersible carbon black.

The self-dispersible carbon black contained in the ink-jet recording black ink of the invention is a self-dispersible black pigment prepared by using, as a raw material, carbon black which can disperse in a solvent by itself without a dispersant such as a surfactant, a polymer dispersant or the like. In general, the self-dispersible pigment has a hydrophilic functional group on surfaces of particles thereof.

It is confirmed by the following self-dispersibility test whether or not a pigment (carbon black) is "self-dispersible".

-Self-dispersibility Test-

A pigment to be tested is dispersed in water with a supersonic homogenizer, a nanomizer, a microfluidizer, a ball mill or the like without a dispersant and the resultant dispersion is diluted with water so that an initial concentration of the pigment becomes about 5% and thus a test dispersion is obtained. 100 g of the test dispersion is put into a glass bottle having a diameter of 40 mm and allowed to stand for one day, and then 2 to 3 µl of the resultant supernatant is sampled and a pigment concentration thereof is measured as well as the initial pigment concentration. If a proportion of the pigment concentration of the surernatant relative to the initial pigment concentration (hereinafter referred to as a "self-dispersibility index") is 98% or more, the pigment used is regarded as "self-dispersible."

At this time, a method for measuring a pigment concentration is not limited, and any of the following methods may be used: a method for measuring an amount of a solid matter obtained by drying the test dispersion, a method in which a test dispersion is diluted to a proper concentration, followed by measuring a transmittance of the resultant, or other methods which can correctly measure a pigment concentration.

The self-dispersible carbon black may be carbon black into which a hydrophilic functional group is introduced and, examples of carbon blacks into which a hydrophilic functional group is to be introduced include furnace black, lamp black, acetylene black, and channel black. Examples of carbon black into which a hydrophilic functional group has been introduced include, but are not limited to, Raven 7000, Raven 5750, Raven 5250, Raven 5000 ULTRA II, Raven 3500, Raven 2500 ULTRA, Raven 2000, Raven 1500, Raven 1255, Raven 1250, Raven 1200, Raven 1190 ULTRA II, Raven 1170, Raven 1080 ULTRA, Raven 1060 ULRTA, Raven 790 ULTRA, Raven 780 ULTRA and Raven 760 ULTRA (manufactured by Columbian Carbon Company); Regal 400R, Regal 330R, Regal 660R, Mogul L, Monarch 700, Monarch 800, Monarch 880, Monarch 900, Monarch 1000, Monarch 1100, Monarch 1300 and Monarch 1400 (manufactured by Cabot Corporation); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (manufactured by Degussa Co.); and No. 25, No. 33, No. 40, No. 47, No. 52, No. 900, No. 2300, MCF-88, MA 600, MA7, MA8 and MA100 (manufactured by Mitsubishi Chemical Co., Ltd.). Carbon black synthesized so as to be suitable for the purpose may also be used.

Methods for introducing a hydrophilic functional group onto particle surfaces of carbon black such as furnace black, lamp black, acetylene black, channel black and the like is not limited, and any of known methods can be used. The following known methods can be used as such: an oxidation treatment with an oxidizing agent (for example, nitric acid, a permanganate, a bichromate, a hypochlorite, ammonium persulfate, hydrogen peroxide, ozone, ozone water or the like), a treatment with a coupling agent such as a silane compound, a polymer grafting treatment, a plasma treatment, a sulfonating treatment with a sulfonating agent such as sulfamic acid or the like, a treatment with a diazonium salt compound having a hydrophilic group; and the like. These methods may be combined. As the method for introducing a hydrophilic functional group to carbon black, modification such as esterification of carbon black or introduction of a polymer chain can also be used.

As hydrophilic functional groups, anionic groups such as an acidic group and/or a salt of an acidic group, nonionic groups such as a hydroxyl group, an oxyethylene chain and the like, and cationic groups such as an amine, ammonium and the like are used. In the invention, a carboxylic acid and/or a salt of a carboxylic acid, a sulfonic acid and/or a salt of a sulfonic acid can be preferably used.

Furthermore, two or more kinds of hydrophilic functional groups can be used in combination as far as they do not adversely affect ink characteristics.

As for materials forming salts, various kinds of basic materials can be used as anionic groups and an alkali metal, ammonia, and an organo onium compound are preferably used alone or in combination. As cationic groups, various kinds of acidic materials can be used and nitric acid, hydrochloric acid, phosphoric acid, acetic acid and the like are preferably used alone or in combination.

As specific examples of hydrophilic functional groups, a sodium salt, a potassium salt and an ammonium salt of a carboxylic acid; and a sodium salt, a potassium salt and an ammonium salt of a sulfonic acid are preferably used.

The content of self-dispersible carbon black (pigment) is preferably in the range of 0.1 to 20% by mass, more preferably in the range of 1 to 10% by mass and still more preferably in the range of 3 to 7% by mass relative to the total amount of the ink. When the content of self-dispersible carbon black (pigment) is large, a nozzle may clog when water contained in the ink evaporates at the distal end of the nozzle. When the content is low, images having sufficient density cannot be obtained.

Self-dispersible carbon black is preferably purified by removing impurities undesirably contained therein in the production process, such as a remaining oxidizing agent and other inorganic compounds and organic compounds. In particular, it is preferable that the content of each of calcium, iron and silicon in the ink is 10 ppm or less and preferably 5 ppm or less. Content of each inorganic impurity can be measured with a high frequency inductive coupling plasma emission spectroscopic analyzing method.

The impurities can be removed with, for example, water washing, a reverse osmosis membrane, an ultrafiltration membrane, an ion exchange method, an adsorption method in which active carbon, zeolite or the like is used and a decomposition method by a heating treatment. These methods can be used alone or in combination.

Examples of water-soluble organic solvent contained in the ink-jet recording black ink of the invention include polyhydric alcohols such as ethylene glycol, diethylene glycol, propylene glycol, dipropylene glycol, burylene glycol, triethylene glycol, 1,5-pentanediol, 1,2,6-hexanetriol, trimethylolpropane, glycerin, and polyethyleneglycol; lower alcohols such as ethanol, isopropyl alcohol, and 1-propanol; nitrogen-containing solvents such as pyrrolidone, N-methyl-2-pyrrolidone, cyclohexylpyrrolidone, and triethanolamine; sulfur-containing solvents such as thiodiethanol, thiodiglycerol, sulfolan, and dimethylsulfoxide; propylene carbonate, and ethylene carbonate, sugars and derivative thereof such as glucose, fructose, galactose, mannose, and xylose; sugar-alcohols; an oxyethylene adduct of glycerin; and an oxyethylene adduct of diglycerin.

The water soluble organic solvents may be used alone or in combination. The content of the water-soluble organic solvent is in the range of 1 to 60% by mass and preferably in the range of 5 to 40% by mass relative to the total mass of the ink.

Type of water contained in the ink-jet recording black ink of the invention is not limited, but deionized water, super pure water, distilled water and ultrafiltrate are preferably used in order to prevent impurities from being mixed in the ink.

A surfactant can be contained in the ink-jet recording black ink of the invention, if necessary, for the purpose of adjusting permeability. The surfactant that can be used can be an anionic surfactant, nonionic surfactant, cationic surfactant, or amphoteric surfactant, and an anionic surfactant and a nonionic surfactant are preferable.

The anionic surfactant can be an alkylbenzene sulfonate, an alkylphenyl sulfonate, an alkylnaphthalene sulfonate, a higher fatty acid salt, a sulfate ester of a higher fatty acid ester, a sulfonate of a higher fatty acid ester, a sulfate ester and a sulfonate of a higher alcohol ether, a higher alkylsulfosuccinate, a polyoxyethylene alkylether carboxylate, a polyoxyethylene alkylether sulfate, an alkylphosphate, and a polyoxyethylene alkylether phosphate, and specific examples of the anionic surfactant include dodecylbenzene sulfonate, isopropylnaphthalene sulfonate, monobutylphenylphenol sulfonate, monobutylbiphenyl sulfonate, monobutylbiphenyl sulfonate, and dibutylphenylphenol disulfonate.

The nonionic surfactants can be a polyoxyethylene alkyl ether, a polyoxyethylene alkyl phenyl ether, a polyoxyethylene fatty acid ester, a sorbitan fatty acid ester, a polyoxyethylene sorbitan fatty acid ester, a polyoxyethylene sorbitol fatty acid ester, a glycerin fatty acid ester, a polyoxyethylene glycerin fatty acid ester, a polyglycerin fatty acid ester, a cane sugar fatty acid ester, a polyoxyethylene alkylamine, a polyoxyethylene fatty acid amide, an alkylalkanolamide, a polyethylene glycol polypropylene glycol block copolymer, acetylene glycol, and a polyoxyethylene adduct of acetylene glycol, and specific examples of the nonionic surfactant include polyoxyethylene nonyl phenyl ether, polyoxyethylene octyl phenyl ether, polyoxyethylene dodecyl phenyl ether, a polyoxyethylene alkyl ether, a polyoxyethylene fatty acid ester, a sorbitan fatty acid ester, a polyoxyethylene sorbitan fatty acid ester, fatty acid alkylolamide, a polyethylene glycol/polypropylene glycol block copolymer, acetylene glycol, and a polyoxyethylene adduct of acetylene glycol.

As other surfactant, a silicone surfactant such as an oxyethylene adduct of polysiloxane, a fluorinated surfactant such as a perfluoroalkylcarboxylate, or a perfluoroalkylsulfonate, an oxyethyleneperfluoroalkyl ether; and a biosurfactant such as spicrispolic acid, rhamnolipid, and lysolecithin can also be used.

Among the above-described surfactants, surfactants each having an unsaturated bond and surfactants each having a secondary or tertiary alkyl group are more preferably used.

Examples of the surfactant each having an unsaturated bond include alkyl ether derivatives of unsaturated alcohols such as oleyl alcohol, elaidyl alcohol, linoleyl alcohol, linolenyl alcohol, 2-heptanedecene-1-ol, and acetylene alcohol; and alkyl ester derivatives of unsaturated fatty acids such as lauroleic acid, myristoleic acid, oleic acid, linoleic acid, linolenic acid, dodecynoic acid, and octadecynoic acid.

Examples of the surfactant each having secondary or tertiary alkyl group include alkyl ether derivatives of branched alcohols such as 2-ethylhexyl alcohol, 2-octanol, 2-hexadecanol, and 2-octadecanol; and alkyl esters of branched fatty acids such as methylheptadcanoic acid, methylpentadecanoic acid, and methyloctadecanoic acid.

The surfactants may be used alone or in combination. An HLB (hydrophile-lipophile balance) of the surfactant is preferably in the range of 3 to 20 in consideration of dissolution stability. The additive amount of the surfactant is preferably in the range of 0.001 to 5% by mass and particularly preferably in the range of 0.01 to 3% by mass relative to the total mass of the ink.

The ink-jet recording ink of the invention can also contain a polymer soluble or dispersible in water. As such a polymer, a polymer obtained by a polymerization reaction, a known water-soluble resin such as a resin from a natural source and a polymer emulsion can be used. As the above-described polymer, a polymer obtained by polymerization of a monomer including a carboxyl group as a hydrophilic group; and a salt thereof can be preferably used in order to dissolve or disperse the polymer into water. Furthermore, a polymer having an acid value, which corresponds to the content of a carboxyl group in the polymer and is represented by an amount (milligrams) of KOH used for neutralizing the polymer, of 30 to 300 is preferably used. The acid value is more preferably in the range of 40 to 250. If the acid value is less than 30, stability and discharge properties of the ink is degraded with ease. If the acid value is higher than 300, an image density decreases with ease.

Examples of the monomer including a carboxylic acid include acrylic acid, methacrylic acid, maleic acid, chrotonic acid, itaconic acid, itaconic acid monoester, maleic acid, a maleic acid monoester, fumaric acid, and fumaric acid monoester. In order to adjust polymer characteristics such as an acid value, a monomer such as a styrene derivative (e.g. styrene, α-methylstyrene, and vinyltoluene), vinylnaphthalene, a vinylnaphthalene derivative, an acrylic acid alkylester, a methacrylic acid alkylester, a chrotonic acid alkylester, an itaconic acid dialkylester, and a maleic acid dialkylester, and a monomer having a sulfonic group, a hydroxyl group, or polyoxyethylene may be copolymerized with the monomer having the above-described hydrophilic group.

The polymer having an acidic group as described above is preferably used in the form of the neutralized salt. The neutralization of the polymer can be conducted with any of basic materials, preferably a basic material containing a hydroxide of an alkali metal. Examples of the hydroxide of alkali metal include NaOH, KOH and LiOH, and NaOH is preferable among them.

In addition to those described above, a polyvinyl alcohol, a polyvinyl pyrrolidone, polyacrylic amide, and poly-N-vinylacetoamide can also be used.

In the case of a polymer soluble in water (water-soluble polymer), the molecular weight of the polymer is preferably in the range of 1,000 to 30,000 and more preferably in the range of 3,000 to 15,000.

In the case of a polymer dispersible in water, the average particle diameter of the polymer is preferably 0.5 μm or less and more preferably in the range of 0.1 to 0.3 μm. A polymer having a film forming property is preferably used to such an extent that printing is not adversely affected. The minimum film forming temperature of such a polymer is 20° C. or lower and preferably 10° C. or lower in the case where a printed matter is not heated. In the case where a printed matter is heated, the lowest temperature is no more than a temperature which the printed matter reaches.

As the polymer soluble or dispersible in water, a polymer obtained from a natural source such as alginic acid can also be used.

Given the mass of the polymer soluble or dispersible in water contained in the ink is A and the mass of the self-dispersible carbon black contained in the ink is B, a value of B/A is preferably in the range of 1 to 50. The value is more preferably in the range of 1 to 25 and still more preferably in the range of 1 to 10. If the value is lower than 1, discharging properties easily degrades. When the value is higher than 50, an effect of improving a color developability is hard to obtain. Therefore, the above range is preferable.

The ink-jet recording black ink of the invention can contain a compound represented by the following formula (1) as a penetrant $$R-O-X_nH \qquad \text{formula (1)}$$

In the formula (1), R indicates a functional group having 4 to 8 carbon atoms which functional group is selected from the group consisting of an alkyl group, an alkenyl group, an alkynyl group, a phenyl group, an alkylphenyl, an alkenylphenyl and a cycloalkyl group, X indicates an oxyethylene group or an oxypropylene group and n is an integer of 1 to 4.

Examples of the compound represented by the formula (1) include ethylene glycol monobutyl ether, diethylene glycol monobutyl ether, propylene glycol monobutyl ether, diethylene glycol monohexyl ether, dipropylene glycol monobutyl ether, triethylene glycol monobutyl ether, triethylene glycol monohexyl ether, diethylene glycol monocyclohexyl ether, triethylene glycol monophenylethyl ether, and dioxypropyleneoxyethylene monopentyl ether, and diethylene glycol monobutyl ether is preferable.

The compound represented by the formula (1) is preferably contained in the ink in an amount of 1 to 20% by mass and more preferably in an amount of 1 to 10% by mass relative to the total mass of the ink. If the content of the compound represented by the formula (1) exceeds 20% by mass, not only such an ink easily bleeds, but also discharging tends to be unstable. If the content is less than 1% by mass, the effect due to adding the compound is hard to obtain.

The ink-jet recording black ink of the invention can contain urea and/or a urea derivative. Examples of urea and a urea derivative include urea, 1,1-dimethylurea, 1,3-dimethylurea, 1,1-diethylurea, and 1,3-diethylurea, and urea is preferable among them. The content of urea and/or the urea derivative is preferably 10% by mass or less and more preferably in the range of 1 to 8% by mass with respect to the total mass of the ink. If the content exceeds 10% by mass, image easily bleeds and an image density easily decreases.

The ink-jet recording black ink of the invention may contain a pH adjusting agent, if necessary, in order to adjust a pH value of the ink. Typical examples of the pH adjusting agents include acids such as hydrochloric acid, a sulfuric acid, nitric acid, acetic acid, citric acid, oxalic acid, malonic acid, boric acid, phosphoric acid, phosphorus acid, and lactic acid; bases such as potassium hydroxide, sodium hydroxide, lithium hydroxide, ammonium hydroxide, triethanol amine, diethanol amine, ethanol amine, 2-amino-2-methyl-1-propanol, and ammonia; and pH buffers such as phosphate, oxalate, an amine salt, a good buffer.

The ink-jet recording black ink of the invention may contain other additive, if necessary. Specifically, the following compounds can be used:

Cellulose derivatives such as ethylcellulose, and carboxymethyl cellulose; a polysaccharide and derivatives thereof; polyethylene glycol, cyclodextrin, macrocyclic amines, dendrimer, and crown ethers can be used as an agent for controlling ink characteristics.

In addition to the above-described agents, an anti-fungi agent, an antiseptic agent, an antioxydant, a viscosity adjusting agent, a conductivity imparting agent, an ultraviolet absorbent, and a chelating agent such as benzoic acid, 1,2-benzisothiazoline-3-one and dehydroacetic acid can be used, if necessary.

A surface tension of the ink-jet recording black ink of the invention is preferably in the range of 25 to 50 mN/m, more preferably in the range of 30 to 50 mN/m and most preferably in the range of 30 to 40 mN/m. A surface tension of the color ink is preferably in the range of 25 to 50 mN/m, more preferably in the range of 25 to 40 mN/m and most preferably in the range of 28 to 37 mN/m. If the surface tension of the ink is excessively high, a drying time of the ink becomes problematically longer. On the other hand, if the surface tension of the ink is excessively low, an optical density on recording paper tends to decrease and an image quality tends to degrade.

The surface tension can be measured using a Wilhelmi type surface tension balance in an environment of a temperature of 23° C. and a relative humidity of 55% RH.

The viscosity of the ink-jet recording black ink of the invention is in the range of 1.5 to 5.0 mPa·s and preferably in the range of 1.8 to 3.0 mPa·s. If the viscosity is excessively low, storage stability of the ink reduces. On the other hand, if the viscosity is excessively high, discharging ability decreases and clogging is hard to remove.

The viscosity here can be measured with Rheomat RM260 (manufactured by Mettler Co.), in which a measuring vessel containing an ink to be measured is set. As for measuring conditions, a measuring temperature is set to 23° C. and a shearing speed is set to $1400 \text{ s}^{-1}$.

The conductivity of the ink-jet recording black ink of the invention varies according to the additive mixed into the ink, but is generally in the range of 0.05 to 0.4 S/m and preferably in the range of 0.07 to 0.3 S/m. If the conductivity is excessively high, storage stability of the ink becomes worse with ease.

The pH value of the ink-jet recording black ink of the invention is preferably in the range of 6.0 to 11.0 and more preferably in the range of 7.5 to 9.0. If the pH value is excessively low, clogging and reduction in storage stability easily occur. If it is excessively high, ahead member is easily corroded or dissolved.

The ink-jet recording black ink of the invention can be prepared, for example, by the following process. Self-dispersible carbon black is dispersed in water and coarse particles are removed from the resultant liquid dispersion by centrifugation or the like, if necessary. In order to disperse the self-dispersible carbon black, a known dispersing means can be used. Furthermore, the dispersing operation and a centrifugation process may be combined with each other. A solvent, a surfactant and other additive are added to thus obtained liquid dispersion of self-dispersible carbon black, and the resultant mixture is stirred, followed by filtration to obtain a desired ink. In the ink-jet recording black ink of the invention, the volume mean particle diameter of dispersed particles contained in the ink and the volume of dispersed particles having a diameter of 0.5 to 1.0 µm contained in the ink can be adjusted within the respective ranges, which are described above, by appropriately controlling, for example, conditions of the centrifugation and dispersing means for preparing the liquid dispersion of carbon black, and stirring conditions when other additive is added to the liquid dispersion of carbon black.

Ink-jet Recording Ink Set

An ink-jet recording ink set of the invention includes the ink-jet recording black ink of the invention, and at least one selected from the group consisting of a cyan ink, a magenta ink and a yellow ink.

-Color Ink-

A color ink includes at least water, a water-soluble organic solvent and a colorant. The water-soluble organic solvent and water contained in the color ink may be the same as or different from those in the black ink. Other components contained in the color ink may also be the same as or different from those in the black ink.

The colorant contained in the color ink may be any of a dye and a pigment, and a dye which makes it easy to obtain a color image having excellent color development is preferably used. Among dyes, a water-soluble dye is preferable. The water-soluble dye may be any of an acidic dye, a direct dye, a basic dye, and a reactive dye, and an acidic dye and a direct dye are preferable.

Examples of the dye include C. I. Direct Blue-1, C. I. Direct Blue-2, C. I. Direct Blue-6, C. I. Direct Blue-8, C. I. Direct Blue-22, C. I. Direct Blue-34, C. I. Direct Blue-70, C. I. Direct Blue-71, C. I. Direct Blue-76, C. I. Direct Blue-78, C. I. Direct Blue-86, C. I. Direct Blue-112, C. I. Direct Blue-142, C. I. Direct Blue-165, C. I. Direct Blue-199, C. I. Direct Blue-200, C. I. Direct Blue-201, C. I. Direct Blue-202, C. I. Direct Blue-203, C. I. Direct Blue-207, C. I. Direct Blue-218, C. I. Direct Blue-236 and C. I. Direct Blue-287; C. I. Direct Red-1, C. I. Direct Red-2, C. I. Direct Red-4, C. I. Direct Red-8, C. I. Direct Red-9, C. I. Direct Red-11, C. I. Direct Red-13, C. I. Direct Red-15, C. I. Direct Red-20, C. I. Direct Red-28, C. I. Direct Red-31, C. I. Direct Red-33, C. I. Direct Red-37, C. I. Direct Red-39, C. I. Direct Red-51, C. I. Direct Red-59, C. I. Direct Red-62, C. I. Direct Red-63, C. I. Direct Red-73, C. I. Direct Red-75, C. I. Direct Red-80, C. I. Direct Red-81, C. I. Direct Red-83, C. I. Direct Red-87, C. I. Direct Red-90, C. I. Direct Red-94, C. I. Direct Red-95, C. I. Direct Red-99, C. I. Direct Red-101, C. I. Direct Red-110, C. I. Direct Red-189 and C. I. Direct Red-227; C. I. Direct Yellow-1, C. I. Direct Yellow-2, C. I. Direct Yellow-4, C. I. Direct Yellow-8, C. I. Direct Yellow-11, C. I. Direct Yellow-12, C. I. Direct Yellow-26, C. I. Direct Yellow-27, C. I. Direct Yellow-28, C. I. Direct Yellow-33, C. I. Direct Yellow-34, C. I. Direct Yellow-41, C. I. Direct Yellow-44, C. I. Direct Yellow-48, C. I. Direct Yellow-58, C. I. Direct Yellow-86, C. I. Direct Yellow-87, C. I. Direct Yellow-88, C. I. Direct Yellow-135, C. I. Direct Yellow-142 and C. I. Direct Yellow-144; C. I. Acid Blue-1, C. I. Acid Blue-7, C. I. Acid Blue-9, C. I. Acid Blue-15, C. I. Acid Blue-22, C. I. Acid Blue-23, C. I. Acid Blue-27, C. I. Acid Blue-29, C. I. Acid Blue-40, C. I. Acid Blue-43, C. I. Acid Blue-55, C. I. Acid Blue-59, C. I. Acid Blue-62, C. I. Acid Blue-78, C. I. Acid Blue-80, C. I. Acid Blue-81, C. I. Acid Blue-83, C. I. Acid Blue-90, C. I. Acid Blue-102, C. I. Acid Blue-104, C. I. Acid Blue-111, C. I. Acid Blue-185, C. I. Acid Blue-249 and C. I. Acid Blue-254; C. I. Acid Red-1, C. I. Acid Red-4, C. I. Acid Red-8, C. I. Acid Red-13, C. I. Acid Red-14, C. I. Acid Red-15, C. I. Acid Red-18, C. I. Acid Red-21, C. I. Acid Red-26, C. I. Acid Red-35, C. I. Acid Red-37, C. I. Acid Red-52, C. I. Acid Red-110, C. I. Acid Red-144, C. I. Acid Red-180, C. I. Acid Red-249 and C. I. Acid Red-257; and C. I. Acid Yellow-1, C. I. Acid Yellow-3, C. I. Acid Yellow-4, C. I. Acid Yellow-7, C. I. Acid Yellow-11, C. I. Acid Yellow-12, C. I. Acid Yellow-13, C. I. Acid Yellow-14, C. I. Acid Yellow-18, C. I. Acid Yellow-19, C. I. Acid Yellow-23, C. I. Acid Yellow-25, C. I. Acid Yellow-34, C. I. Acid Yellow-38, C. I. Acid Yellow-41, C. I. Acid Yellow-42, C. I. Acid Yellow-44, C. I. Acid Yellow-53, C. I. Acid Yellow-55, C. I. Acid Yellow-61, C. I. Acid Yellow-71, C. I. Acid Yellow-76, C. I. Acid Yellow-78, C. I. Acid Yellow-79 and C. I. Acid Yellow-122.

The content of the dye is preferably in the range of 0.1 to 20% by mass, more preferably in the range of 1 to 10% by mass and still more preferably in the range of 1 to 5% by mass relative to the total mass of the ink. If the content of the dye is too large, a nozzle easily clogs when water contained in the ink evaporates at the distal end of the nozzle. When the contact is too small, insufficient density is naturally obtained. Therefore, the above range is preferable.

Examples of the cyan pigment include, but are not limited to, C. I. Pigment Blue 1, C. I. Pigment Blue 2, C. I. Pigment Blue 3, C. I. Pigment Blue 15, C. I. Pigment Blue 15:1, C. I. Pigment Blue 15:3, C. I. Pigment Blue 15:4, C. I. Pigment Blue 16, C. I. Pigment Blue 22, and C. I. Pigment Blue 60.

Examples of the magenta pigment include, but are not limited to, C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202, and C. I. Pigment Violet 1960.

Examples of the yellow pigment include, but are not limited to, C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 55, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 114, C. I. Pigment Yellow 128, C. I. Pigment Yellow 129, C. I. Pigment Yellow 150, C. I. Pigment Yellow 151, C. I. Pigment Yellow 154, C. I. Pigment Yellow 180 and C. I. Pigment Yellow 185.

In addition to pigments having any of three primary colors including the cyan color, magenta color and yellow color, pigments having a specific color such as red, green, blue, brown, and white, pigments having a metallic luster color such as gold color and silver color, colorless fillers and plastic pigments may be used as the pigment, but pigments which can be used in the invention are not limited to these pigments, and synthesized pigments may also be used. The color pigment can be dispersed in the ink with a known dispersant. Moreover, when the color pigment is self-dispersible, it may disperse in the ink without a dispersant as explained in the description of self-dispersible carbon black, and the self-dispersible color pigment is preferable.

The other components of the color ink are similar to those of the ink-jet recording black ink of the invention.

It is preferable that a drying time of the color ink is shorter than that of the black color in the ink-jet recording ink set of the invention, since bleeding among respective color images (inter-color bleeding) easily occurs on a recording medium if the drying time of the color ink is longer than that of the black ink. Drying time can be adjusted by controlling physical properties of the ink such as a surface tension, a viscosity or the like, adding a penetrant such as a surfactant or a polymer, or selecting the amount of each droplet, a printing density or the like, and combinations of these methods can also be used.

Ink-Jet Recording Method

In the ink-jet recording method of the invention, the ink-jet recording ink set of the invention (or the ink-jet recording black ink of the invention) is used. In the ink-jet recording method of the invention, ink droplets are discharged from an orifice onto a recording medium according to recording signals to thereby record images. In this recording method, it is preferable to adjust an ink composition and an amount of ink discharged onto paper so that a drying time of the ink on the recording medium (particularly plain paper) is 5 seconds or shorter. The drying time in this specification is a duration from completion of printing until a time when images are no longer transferred onto adjacent sheets of paper. With a longer drying time, irregular bleeding or inter-color bleeding easily occurs and, when another sheet of paper is overlapped on a printed surface, the ink is transferred to the back surface of the sheet of paper.

In the ink-jet recording method of the invention, the amount of one ink droplet of black ink is preferably 20 ng or less and the amount of one ink droplet of color ink is preferably 7 ng or less. When the amount of one ink droplet is set to the above-descried ranges, images with high density and a high quality are obtained without drying characteristics of the ink reducing. If the amount of one ink droplet is excessively large, a drying time of the ink tends to become longer, and degradation in image quality easily occurs. Therefore, the above-descried ranges are preferable.

In the ink-jet recording method of the invention, a printing speed is preferably 6 kHz or higher and more preferably in the range of 6 kHz to 36 kHz. Furthermore, an interval between completion of monochrome printing and initiation of subsequent color printing or vice versa is preferably 5 ms or longer and more preferably in the range of 5 to 64 ms. In the invention, use of the ink-jet recording black ink of the invention enables printing of images having sufficient density of black image portions and suppression of bleeding of color image portions even if various types of plain papers are used and even if the printing speed and the interval are within the respective ranges which are described above.

As a recording apparatus for conducting the ink-jet recording method of the invention, a known ink-jet recording apparatus is used and example thereof include ordinary thermal ink-jet recording apparatuses, a recording apparatus including a heater for assisting fixing of the ink onto paper and a recording apparatus having an intermediate transfer mechanism, in which recording apparatus the ink is discharged to an intermediate member, and then transferred onto a recording medium such as paper.

EXAMPLES

Description of examples of the present invention will be given below. However, the examples are not intended to limit the invention.

Preparation of Pigment Dispersion Liquid

Black Pigment Dispersion Liquid 1

Bonjet Black CW-2 manufactured by Orient Chemical Industries, Ltd. and having a self-dispersibility index of 100% is centrifuged at 8,000 rpm for 15 minutes with a centrifuge (manufactured by Sakuma Seisakusho K.K., a trade name "MODEL 50A-7") to obtain a pigment dispersion liquid. Part of the pigment dispersion liquid is sampled and dried up to calculate the pigment content, and pure water is added to the pigment so that the pigment concentration in the resultant mixture is 10% by mass based on the calculated pigment content to thereby prepare a black pigment dispersion liquid 1. (The volume mean diameter of the pigment particles contained in the 5% pigment dispersion liquid obtained by diluting the black pigment dispersion liquid 1 is 105 nm and the volume of pigment particles having a particle diameter of 0.5 to 1.0 $\mu$m is 0.006% relative to the total volume of the dispersion liquid).

Black Pigment Dispersion Liquid 2

A trial product of dispersion liquid of self-dispersible carbon black having a —$C_6H_4COONa$ group on surfaces of particles thereof (which is a 15% pigment dispersion liquid with a volume mean diameter of particles contained in a 5% aqueous dispersion obtained by diluting the 15% pigment dispersion liquid being 102 nm) is centrifuged at 8,000 rpm for 15 minutes with a centrifuge (manufactured by Sakuma Seisakusho K.K., a trade name "MODEL 50A-7") to obtain a pigment dispersion liquid. Part of the pigment dispersion liquid is sampled and dried up to calculate the pigment content, and pure water is added to the pigment so that the pigment concentration in the resultant mixture is 10% by mass based on the calculated pigment content to thereby prepare a black pigment dispersion liquid 2. (The volume mean diameter of the pigment particles contained in the 5% pigment dispersion liquid obtained by diluting the black pigment dispersion liquid 2 is 92 nm and the volume of pigment particles having a particle diameter of 0.5 to 1.0 μm is 0.009% relative to the total volume of the dispersion liquid).

Black Pigment Dispersion liquid 3

Bonjet Black CW-2 manufactured by Orient Chemical Industries, Ltd. and having a self-dispersibility index of 100% is centrifuged at 8,000 rpm for 15 minutes with a centrifuge (manufactured by Sakuma Seisakusho K.K., a trade name "MODEL 50A-7"). The centrifugation is repeated twice again to obtain a pigment dispersion liquid. Part of the pigment dispersion liquid is sampled and dried up to calculate the pigment content, and pure water is added to the pigment so that the pigment concentration in the resultant mixture is 10% by mass based on the calculated pigment content to thereby prepare a black pigment dispersion liquid 3. (The volume mean diameter of the pigment particles contained in the 5% pigment dispersion liquid obtained by diluting the black pigment dispersion liquid 3 is 88 nm and the volume of pigment particles having a particle diameter of 0.5 to 1.0 μm is 0.0007% relative to the total volume of the dispersion liquid).

Black Pigment Dispersion liquid 4

Cabojet 300 manufactured by Cabot Corporation with a self-dispersibility index of 100% is centrifuged at 8,000 rpm for 30 minutes with a centrifuge (manufactured by Sakuma Seisakusho K.K., a trade name "MODEL 50A-7") to obtain a pigment dispersion liquid. Part of the pigment dispersion liquid is sampled and dried up to calculate the pigment content, and pure water is added to the pigment so that the pigment concentration in the resultant mixture is 10% by mass based on the calculated pigment content to thereby prepare a black pigment dispersion liquid 4. (The volume mean diameter of the pigment particles contained in the 5% pigment dispersion liquid obtained by diluting the black pigment dispersion liquid 4 is 60 nm and the volume of pigment particles having a particle diameter of 0.5 to 1.0 μm is 0.0001% relative to the total volume of the dispersion liquid).

Black Pigment Dispersion Liquid 5

Water is added directly into Bonjet Black CW-2 manufactured by Orient Chemical Industries, Ltd. and having a self-dispersibility index of 100% so that a pigment concentration is 10% by mass to prepare a black pigment dispersion liquid 5 (The volume mean diameter of the pigment particles contained in the 5% pigment aqueous dispersion liquid obtained by diluting the black pigment dispersion liquid 5 is 105 nm and the volume of pigment particles having a particle diameter of 0.5 to 1.0 μm is 0.045% relative to the total volume of the dispersion liquid).

Example 1

| Black Ink 1 | |
|---|---|
| black pigment dispersion liquid 1 | 45 parts by mass |
| diethylene glycol | 20 parts by mass |
| polyoxyethylene adduct of 2-ethylhexyl alcohol | 0.15 parts by mass |
| polyoxyethylene oleyl ether | 0.07 parts by mass |
| urea | 6 parts by mass |
| Proxel GXL (manufactured by Zeneca Co.) | 0.1 parts by mass |
| water | 28.68 parts by mass |

The above-described components are mixed and stirred, and filtered with through a 2 μm pore size membrane filter to obtain black ink 1.

Example 2

| Black Ink 2 | |
|---|---|
| black pigment dispersion liquid 2 | 45 parts by mass |
| diethylene glycol | 10 parts by mass |
| glycerin | 10 parts by mass |
| polyoxyethylene adduct of 2-ethylhexyl alcohol | 0.15 parts by mass |
| polyoxyethylene oleyl ether | 0.07 parts by mass |
| urea | 2 parts by mass |
| water | 32.78 parts by mass |

The above-described components are mixed and stirred, and filtered with a 2 μm pore size membrane filter to obtain black ink 2.

Comparative Example 1

Black Ink 3

A black ink 3 is obtained in the same manner as in Example 1 except that the black pigment dispersion liquid 1 is replaced with the black pigment dispersion liquid 3.

Comparative Example 2

Black Ink 4

A black ink 4 is obtained in the same manner as in Example 1 except that the black pigment dispersion liquid 1 is replaced with the black pigment dispersion liquid 4.

Comparative Example 3

Black Ink 5

A black ink 5 is obtained in the same manner as in Example 1 except that the black pigment dispersion liquid 1 is replaced with the black pigment dispersion liquid 5.

Evaluation on Physical Properties of Ink

The following physical properties of the black inks are measured. Results are shown in Table 1.

Surface Tension of Ink

Surface tension of each of the inks is measured with a Wilhelmi type surface tension balance in an environment of a temperature of 23° C. and a relative humidity 55% RH.

Viscosity of Ink

Rheomat RM260 (manufactured by METTLER Co.) is used as a measuring apparatus and each ink is put in a measuring vessel and the measuring vessel is set in the apparatus for measurement. The measuring conditions at this time are a measuring temperature of 23° C. and a shearing speed of 1400 s$^{-1}$. Volume mean diameter of dispersed particles contained in each ink (indicated as "particle diameter" in Table 1)

Microtrack UPA particle size analyzer 9340 (manufactured by Leeds & Northrup Co.) is used and the volume mean diameter of dispersed particles in each ink which have not been diluted is defined as the particle diameter of the ink. As for parameters input to the particle size analyzer at the time of measurement, a viscosity of an ink to be measured is used and density of a colorant is used as the density of dispersed particles. Volume of particles having a particle diameter of 0.5 to 1.0 μm (indicated as "particle volume" in Table 1).

Accusizer™ 770 Optical Particle Sizer (manufactured by Particles Sizing Systems Inc.) is used as a measuring apparatus and 2 μl of each ink is put in a measurement vessel and the measurement vessel is set in the apparatus for measurement.

TABLE 1

|  | Surface tension (mN/m) | Viscosity (mPa · s) | Particle diameter (nm) | Particle volume (%) |
|---|---|---|---|---|
| Example 1 (black ink 1) | 35 | 2.5 | 102 | 0.005 |
| Example 2 (black ink 2) | 38 | 2.4 | 88 | 0.008 |
| Comparative Example 1 (black ink 3) | 34 | 2.4 | 86 | 0.0006 |
| Comparative Example 2 (black ink 4) | 38 | 2.6 | 60 | 0.0001 |
| Comparative Example 3 (black ink 5) | 35 | 2.5 | 103 | 0.037 |

Image Recording

Each of the black inks prepared as described above, and a cyan ink 1, a magenta ink 1 and a yellow ink 1 prepared as described below are put in trial products of print heads of a thermal ink jet method and printing is performed under conditions that the amount of each droplet of the black ink is 15 ng, the amount of each droplet of the color ink is 5 ng, an original image is scanned once and the corresponding image which is comprised of four color images printed by respective print heads is formed, a printing speed is 18 kHz, and an interval between completion of monochrome printing and initiation of subsequent color printing or vice versa is 16 ms. Then, the following evaluations are conducted. Results are shown in Table 2.

FX-P paper (manufactured by Fuji Xerox Co., Ltd.), and 4024 paper and 4200 paper (manufactured by Fuji Xerox Co., Ltd.) are used as a recording medium.

| Preparation of Color Ink Cyan Ink 1 | |
|---|---|
| C. I. Direct Blue 199 | 3 parts by mass |
| diethylene glycol | 20 parts by mass |
| diethylene glycol monobutyl ether | 5 parts by mass |
| urea | 6 parts by mass |
| water | 66 parts by mass |

The above-described components are mixed with each other and stirred, and a pH value of the resultant mixture is adjusted to 8 with a 1 N NaOH aqueous solution, and the resultant is filtered with a 0.45 μm pore size membrane filter to obtain the cyan ink 1.

-Magenta Ink 1-

The magenta ink 1 is obtained by the same process as that of the cyan ink 1 except that C. I. Direct Blue 199 is replaced with C. I. Acid Red 52.

-Yellow Ink 1-

The yellow ink 1 is obtained by the same process as that of the cyan ink 1 except that C. I. Direct Blue 199 is replaced with C. I. Direct Yellow 144.

Density of Black Image

Solid black images are printed on the above-described three types of paper with the above-described printing apparatus and an optical density of each of the printed images is measured with an optical densitometer X-Rite MODEL404 (manufactured by X-Rite Inc.).

The optical density of the type of paper among the three types of paper, which type has the lowest density, is evaluated with the following criteria.

○ . . . 1.4 or higher.

× . . . Lower than 1.4.

Inter-color Bleeding

Solid images are printed on the three types of paper with the above-described printing apparatus so that black images adjoins a cyan image, a magenta image and an yellow image. A visual check is made to determine whether adjoining portions between the black images and the color images bleed. The following criteria is used to evaluate the type of paper among the three types of paper, which type has the most bleeding.

○ . . . The adjoining portions does not bleed

Δ . . . The adjoining portions slightly bleeds.

× . . . The adjoining portions remarkably bleeds

Clogging Removability Test

After confirming that normal printing can be performed with the above-described printing apparatus, the apparatus is left unused for 7 days in an environment of a temperature of 23° C. and a relative humidity of 55% RH, with the head thereof capped, and then a restoring operation by discharging ink is repeatedly performed till normal printing can be performed again. The number of discharging operations conducted is counted and clogging removability is evaluated under the following criteria:

○ . . . Normal printing is restored when at most 10,000 discharging operations are conducted.

× . . . Normal printing cannot be restored when 10,000 discharging operations are conducted.

Drying characteristics Evaluation

Solid images are printed on the above-described three types of paper. After a predetermined time for drying lapses from the completion of printing, another sheet of the same kind of paper is superimposed on the printed image. These steps are repeated while the drying time is changed. The type of paper which needs the longest drying time among the three types of paper is used to evaluate drying characteristics of each ink. Evaluation is conducted using the following criteria:

○ . . . 5 seconds or shorter.

Δ . . . Exceeding 5 seconds and shorter than 10 seconds.

× . . . 10 seconds or longer.

TABLE 2

|  | black image density | inter-color bleeding | Clogging removability test | Drying characteristics evaluation |
|---|---|---|---|---|
| Example 1 (black ink 1) | ○ | ○ | ○ | ○ |
| Example 2 (black ink 2) | ○ | ○ | ○ | ○ |

TABLE 2-continued

|  | black image density | inter-color bleeding | Clogging removability test | Drying characteristics evaluation |
|---|---|---|---|---|
| Comparative Example 1 (black ink 3) | X | ○ | ○ | ○ |
| Comparative Example 2 (black ink 4) | X | Δ | ○ | ○ |
| Comparative Example 3 (black ink 5) | ○ | ○ | X | ○ |

As is clear from results of Table 2, Use of the ink-jet recording black ink of the invention makes it possible to print images having higher density of black image portions and having no bleeding between each of color image portions and the black image portions on various kinds of paper. It is found that, particularly, the densities of the black images are high and bleeding between black image portions and color image portions can be improved even if the interval between completion of monochrome printing and initiation of subsequent color printing or vice versa is short. Furthermore, it is found that clogging removability is good (normal printing can be easily restored), thereby enabling stable recording of images.

What is claimed is:

1. An ink-jet recording black ink comprising at least water, a water-soluble organic solvent and a self-dispersible carbon black, wherein a volume mean diameter of dispersed particles contained in the ink is in a range of 85 to 115 nm, and a volume of dispersed particles having a particle diameter of 0.5 to 1.0 μm contained in the ink is in a range of 0.001 to 0.03% relative to a volume of the ink.

2. The ink-jet recording black ink of claim 1, wherein the self-dispersible carbon black has a hydrophilic functional group.

3. The ink-jet recording black ink of claim 1, wherein a content of the self-dispersible carbon black is in a range of 0.1 to 20% by mass relative to a mass of the ink.

4. The ink-jet recording black ink of claim 1, wherein a content of the water-soluble organic solvent is in a range of 1 to 60% by mass relative to a mass of the ink.

5. The ink-jet recording black ink of claim 1, further comprising a polymer.

6. The ink-jet recording black ink of claim 1, further comprising a penetrant.

7. An ink-jet recording ink set comprising a black ink and at least one of a cyan ink, a magenta ink and a yellow ink, the black ink containing at least water, a water-soluble organic solvent and a self-dispersible carbon black, wherein a volume mean diameter of dispersed particles contained in the black ink is a range of 85 to 115 nm, and a volume of dispersed particles having a particle diameter of 0.5 to 1.0 μm contained in the black ink is in a range of 0.001 to 0.03% relative to a volume of the black ink.

8. The ink-jet recording ink set of claim 7, wherein the self-dispersible carbon black has a hydrophilic functional group.

9. The ink-jet recording ink set of claim 7, wherein a content of the self-dispersible carbon black is in a range of 0.1 to 20% by mass relative to a mass of the black ink.

10. The ink-jet recording ink set of claim 7, wherein a content of the water-soluble organic solvent is in a range of 1 to 60% by mass relative to a mass of the black ink.

11. The ink-jet recording ink set of claim 7, wherein the black ink further contains a polymer.

12. The ink-jet recording ink set of claim 7, wherein the black ink further contains a penetrant.

13. An ink-jet recording method in which ink droplets of respective inks of an ink set are discharged onto a recording medium according to recording signals to record an image, wherein the ink set contains a black ink and at least one of a cyan ink, a magenta ink and a yellow ink, the black ink comprises at least water, a water-soluble organic solvent and a self-dispersible carbon black, a volume mean particle diameter of dispersed particles contained in the black ink is in a range of 85 to 115 nm, and a volume of dispersed particles having a particle diameter of 0.5 to 1.0 μm contained in the black ink is in a range of 0.001 to 0.03% relative to a volume of the black ink.

14. The ink-jet recording method of claim 13, wherein an amount of each ink droplet of the black ink is 20 ng or less and an amount of said at least one of a cyan ink, a magenta ink and a yellow ink is 7 ng or less.

15. The ink-jet recording method of claim 13, wherein the self-dispersible carbon black has a hydrophilic functional group.

16. The ink-jet recording method of claim 13, wherein a content of the self-dispersible carbon black is in a range of 0.1 to 20% by mass relative to a mass of the black ink.

17. The ink-jet recording method of claim 13, wherein a content of the water-soluble organic solvent is in a range of 1 to 60% by mass relative to a mass of the black ink.

18. The ink-jet recording method of claim 13, wherein the black ink further contains a polymer.

19. The ink-jet recording method of claim 13, wherein the black ink further contains a penetrant.

20. The ink-jet recording method of claim 13, wherein the ink droplets are formed by thermal energy.

* * * * *